(12) United States Patent
Bellet et al.

(10) Patent No.: US 11,691,717 B2
(45) Date of Patent: Jul. 4, 2023

(54) COMPACT AIRCRAFT MAIN LANDING GEAR MODULE ALLOWING MODULAR MOUNTING

(71) Applicant: Airbus Operations (S.A.S.), Toulouse (FR)

(72) Inventors: Daniel Bellet, Toulouse (FR); Alexandre Legardez, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 17/506,300

(22) Filed: Oct. 20, 2021

(65) Prior Publication Data

US 2022/0126985 A1    Apr. 28, 2022

(30) Foreign Application Priority Data

Oct. 22, 2020    (FR) ...................................... 2010866

(51) Int. Cl.
*B64C 1/06* (2006.01)
*B64C 25/26* (2006.01)
*B64C 25/16* (2006.01)

(52) U.S. Cl.
CPC .............. *B64C 25/26* (2013.01); *B64C 1/068* (2013.01); *B64C 25/16* (2013.01)

(58) Field of Classification Search
CPC .......... B64C 25/16; B64C 25/56; B64C 1/068
See application file for complete search history.

(56) References Cited

U.S. PATENT DOCUMENTS

| | | | |
|---|---|---|---|
| 5,692,703 A | 12/1997 | Murphy et al. | |
| 9,499,256 B2* | 11/2016 | Nakashima | B64C 25/12 |
| 2014/0151500 A1* | 6/2014 | Belief | B64C 25/10 244/102 A |
| 2014/0158828 A1* | 6/2014 | Loyant | B64C 1/26 244/131 |
| 2016/0185451 A1* | 6/2016 | Bellet | B64C 1/18 244/129.1 |
| 2018/0162514 A1* | 6/2018 | Bellet | B64D 27/12 |
| 2019/0112034 A1* | 4/2019 | Bellet | B64C 25/16 |
| 2020/0094949 A1* | 3/2020 | Bernadet | B64C 25/04 |

FOREIGN PATENT DOCUMENTS

| | | |
|---|---|---|
| EP | 3 626 610 A1 | 3/2020 |
| FR | 2 913 400 A1 | 9/2008 |
| FR | 2 998 868 A1 | 6/2014 |
| FR | 3 031 080 A1 | 7/2016 |

OTHER PUBLICATIONS

French Search Report for Application No. 2010866 dated Jun. 10, 2021.

* cited by examiner

*Primary Examiner* — Tye William Abell
(74) *Attorney, Agent, or Firm* — KDW Firm PLLC

(57) ABSTRACT

A module includes two main landing gears and a landing gear bay containing the landing gears. The bay has two lateral walls, a roof wall, a front wall and a rear wall. The roof wall, the front wall and the rear wall together form a pressurization barrier between the bay and a pressurized compartment. By virtue of the landing gear module, it is now possible to assemble and test the main landing gears and the one or more doors and the fairing before they are installed on the aircraft.

20 Claims, 2 Drawing Sheets

COMPACT AIRCRAFT MAIN LANDING GEAR MODULE ALLOWING MODULAR MOUNTING

CROSS-REFERENCE TO RELATED APPLICATION

This application claims priority to French patent application number 20 10866 filed on Oct. 22, 2020, the entire disclosure of which is incorporated by reference herein.

TECHNICAL FIELD

The disclosure herein relates to the field of aircraft fuselage assembly. In particular, it relates to a landing gear module.

BACKGROUND

The function of a landing gear bay consists in storing the one or more landing gears of an aircraft. Usually, a main landing gear bay comprises at least three parts: a roof wall, two lateral walls and a rear wall. The roof wall and the rear wall form a pressurization barrier. In the document FR 2 998 868, the front wall of the bay is provided by a rear wall of a center wing box to which the wings of the aircraft are fastened. The roof wall joining the two lateral walls has diaphragms and gantries in order to perform its role of pressurization barrier and take into account a possible offset with the center wing box. The lateral walls have flat panels or diaphragms between the fuselage skin and the first gantry in order to ensure overall stiffness of the fuselage during lateral bending. The rear wall has reinforced panels and vertical spars made of composite or metallic material.

This type of landing gear bay is dependent on the center wing box. The landing gear, for its part, is generally installed on the wing. It is therefore necessary to join the bay to the center wing box and the wing itself so as to be able to operate or test the landing gear during the last steps of final assembly of the aircraft.

SUMMARY

An object of the disclosure herein is to overcome this drawback by proposing a compact landing gear module allowing modular mounting.

To this end, the disclosure herein relates to an aircraft main landing gear module comprising at least;
  two main landing gears, called landing gears, configured to be deployed or retracted alternately or simultaneously; and
  a landing gear bay containing the landing gears.

According to the disclosure herein, the landing gear bay has at least:
  two lateral walls;
  a roof wall;
  a front wall; and
  a rear wall;
the roof wall, the front wall and the rear wall being configured to form together a pressurization barrier between the bay and a pressurized compartment.

Thus, by virtue of the disclosure herein, it is no longer necessary to join the landing gear bay to a center wing box in order to be able to operate and test the landing gear after final assembly of the aircraft. The landing gears and the one or more doors and the fairing can thus be assembled and tested before installation on the aircraft. In particular, the bay has a front wall that makes it possible to have a complete module that is independent of the center wing box. A module allowing modular assembly of the bay is thus obtained.

Furthermore, the module comprises at least one door configured to close the bay when the landing gears are retracted or deployed.

In addition, the module comprises a system for controlling the landing gears that is configured to deploy or retract the landing gears.

Furthermore, the module comprises a belly fairing around the bay.

The aircraft also relates to a central aircraft fuselage part. According to the disclosure herein, the central part comprises at least, in order from the front towards the rear of the aircraft:
  a front section of the central fuselage part;
  a center wing box comprising at least a front wall, a rear wall and a roof wall that together form a pressurization barrier;
  a central section of the central fuselage part comprising an intermediate wall forming a pressurization barrier, the intermediate wall comprising a front end and a rear end, the front end being connected to an edge of the rear wall of the center wing box;
  a landing gear module as described above, the rear end of the intermediate wall being connected to an edge of the front wall of the landing gear bay; and
  a rear section of the central fuselage part.

The central part also comprises a keel beam to which are fastened the front section, the center wing box, the central section and the landing gear module.

Furthermore, the central part comprises an air conditioning and pressurization system of the aircraft.

In addition, the central part comprises a hydraulic system.

Furthermore, the central part comprises a fuel management system.

The disclosure herein also relates to a fuselage comprising a central fuselage part as described above.

The disclosure herein also relates to an aircraft, in particular a transport aeroplane, having a fuselage as specified above.

BRIEF DESCRIPTION OF THE DRAWINGS

The disclosure herein, with its features and advantages, will become more clearly apparent upon reading the description provided with reference to the appended drawings, in which.

DETAILED DESCRIPTION

Figure 1:
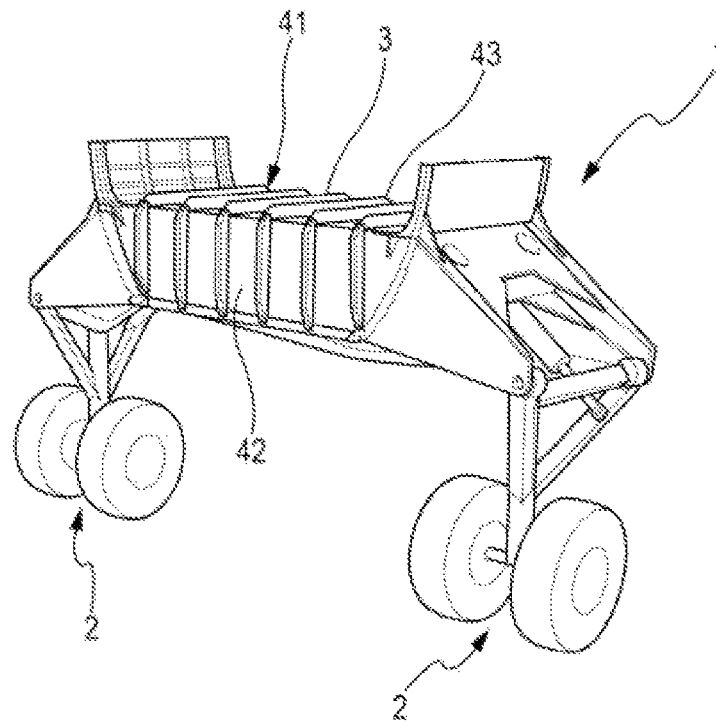
FIG. 1 shows a perspective view of a landing gear module.

The landing gear module 1 is shown in FIG. 1. This landing gear module 1 is able to be mounted on an aircraft AC (FIG. 4) in a modular manner.

Figure 2:
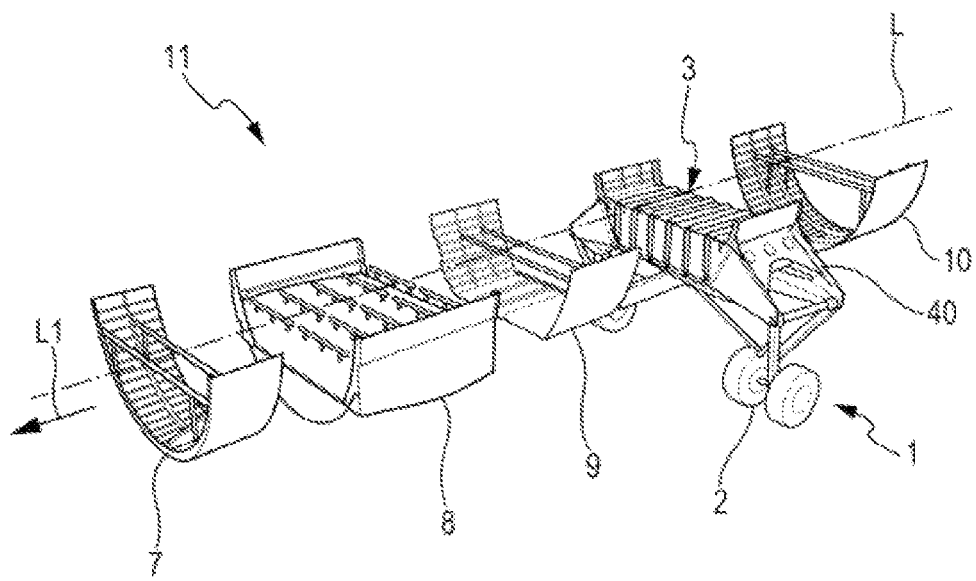
FIG. 2 shows an exploded perspective view of a central fuselage part comprising the landing gear module.
Figure 3:
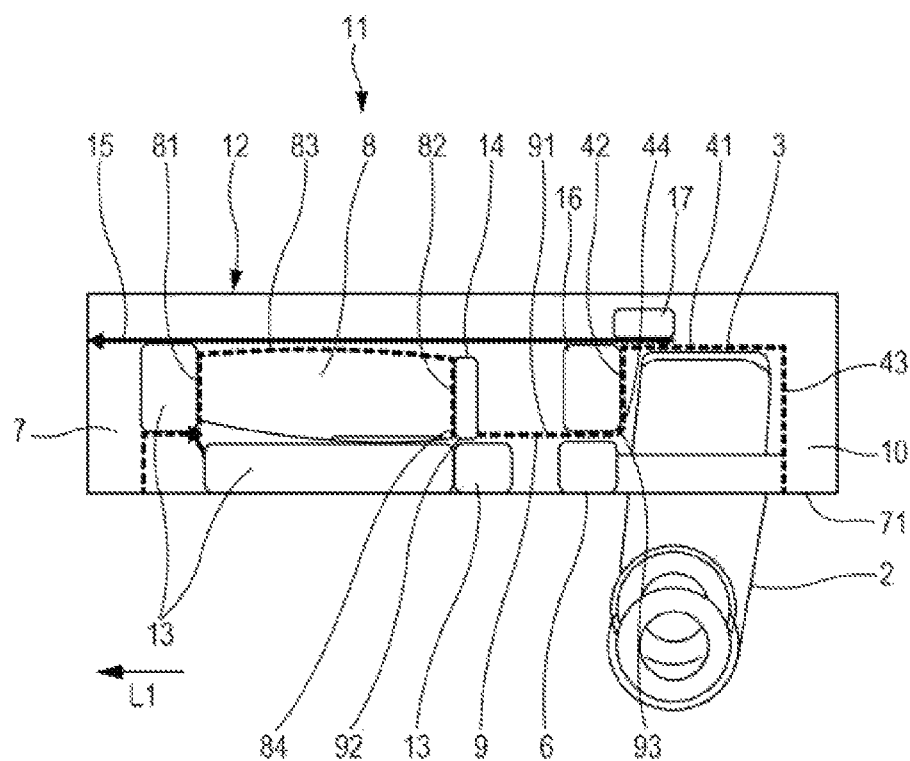
FIG. 3 schematically shows a longitudinal section of a central fuselage part.
Figure 4:
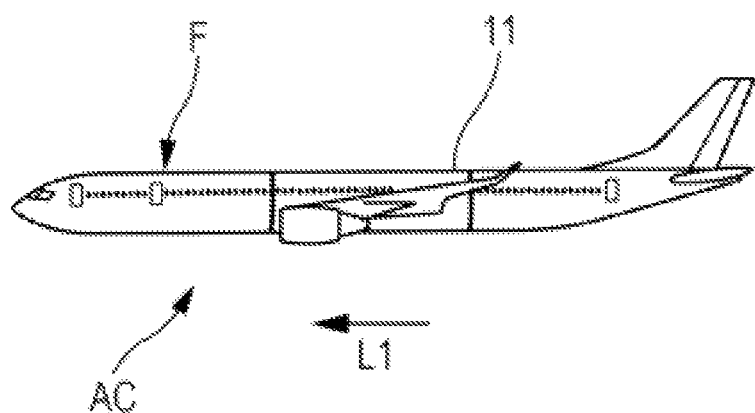
FIG. 4 shows a profile view of an aircraft comprising a central fuselage part provided with a landing gear module.

As an aid to the description, there is shown in FIG. 2, FIG. 3 and FIG. 4, an arrow L1 that indicates a direction defining what is referred to as a direction towards the "front" (directed along the longitudinal axis L of the aircraft AC), namely towards the front of the aircraft AC in the direction of flight (or movement) of the aircraft AC. The opposite direction to that of the arrow L1 defines what is referred to as a direction towards the "rear".

The main landing gear module 1 of the aircraft AC comprises at least two main landing gears 2 (called "landing gears" in the remainder of the description), which are configured to be deployed or retracted simultaneously or alternately and a landing gear bay 3 containing the landing gears 2.

The bay 3 has at least two lateral walls 40, a roof wall 41, a front wall 42 and a rear wall 43. The bay 3 thus has a parallelepipedal overall shape.

The roof wall 41, the front wall 42 and the rear wall 43 together form a pressurization barrier (shown by a dashed line in FIG. 3) with a pressurized compartment 12. The pressurized compartment 12 corresponds, for example, to the cabin of the aircraft AC or a pressurized hold of the aircraft AC.

The roof wall 41 extends between the front wall 42 and the rear wall 43 along the longitudinal axis L and extends between one lateral wall 40 and the other lateral wall 40 in a direction perpendicular to the longitudinal axis L.

The front wall 42 of the bay extends between the roof wall 41 and an edge 44.

The landing gear module can also comprise at least one door (not shown) that is configured to, alternately, close the bay 3 when the landing gears 2 are retracted or deployed and open the bay 3 during the deployment or retraction of the landing gears 2. With the door for closing/opening the bay 3, the roof wall 41, the front wall 42, the rear wall 43 and the lateral walls 40 form a closed and independent assembly. In the embodiment illustrated, the assembly is a closed parallelepipedal box. It opens only via the door for the deployment/retraction of the landing gears.

Since it forms a box comprising its own walls, it constitutes an independent module that can be tested independently of the center wing box.

The landing gear module 1 can also comprise a system for controlling the landing gears (which is not shown) that is configured to deploy or retract the landing gears 2.

Furthermore, the landing gear module 1 can comprise a belly fairing 71 around the bay 3.

The disclosure herein also relates to a central fuselage part 11 of the aircraft AC.

The central fuselage part 11 comprises at least, in order from the front towards the rear of the aircraft AC in the direction L1 of the longitudinal axis L (FIG. 2):
  a front section 7 of the central fuselage part 11;
  a center wing box 8 comprising at least a front wall 81, a rear a 82 and a roof wall 83 that together form a pressurization barrier;
  a central section 9 of the central fuselage part 11 comprising an intermediate wall 91 forming a pressurization barrier;
  a landing gear module 1; and
  a rear section 10 of the central fuselage part 11.

It is clear upon studying this figure that the module 1 is indeed independent of the center wing box.

The central fuselage part 11 also comprises a keel beam (not shown). Advantageously, the front section 7, the center wing box 8, the central section 9, the landing gear module 1 and the rear section 10 are fastened to the keel beam. The keel beam can also make it possible to fasten the central fuselage part 11 to the rest of the fuselage of the aircraft AC.

FIG. 3 shows a longitudinal section of an example of the central fuselage part 1.

The intermediate wall 91 comprises a front end 92 and a rear end 93. The front end 92 is connected to an edge 84 of the rear wall 82 of the center wing box 8. In addition, the rear end 93 of the intermediate wall 91 is connected to the edge 44 of the front wall 42 of the bay 3.

Advantageously, the front end 92 and the edge 84 are connected to each other by an angle bar. Likewise, the rear end 93 of the intermediate wall 91 and the edge 44 are connected to each other by an angle bar.

The longitudinal section shown in FIG. 3 shows a floor 15 of the cabin of the aircraft AC and the pressurization barrier (shown in dashed line in FIG. 3) formed by the walls 41, 42 and 43 of the landing gear module 1, the walls 81, 82 and 83 of the center wing box 8 and the intermediate wall 91.

As shown in FIG. 3, the central fuselage part as described above makes it possible to integrate a plurality of useful systems that are on board the aircraft AC.

Thus, the central fuselage part 1 can comprise an air conditioning and pressurization system 13 of the aircraft AC. This air conditioning and pressurization system 13 is of use, for example, for air conditioning and pressurizing the pressurized compartment 12. This system 13 is located in the non-pressurized zone.

The central fuselage part 1 can also comprise a hydraulic system 6. This hydraulic system 6 can be used for the operation of actuators on board the aircraft AC, such as actuators implementing the deployment or the retraction of the landing gears 2.

The central fuselage part can also comprise a fuel management system 14. This system 14 can be disposed against the rear wall 82 of the center wing box 8 on the intermediate wall 91.

It can also comprise a water tank 16 that is disposed, for example, against the front wall 42 of the bay 3 on the intermediate wall 91.

Furthermore, it can comprise a main central warning panel unit (MCU) 17 that can be disposed on the floor 15 above the bay 3.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft main landing gear module for an aircraft, the aircraft main landing gear module comprising:
  two main landing gears configured to be deployed or retracted alternately or simultaneously; and
  a landing gear bay containing the landing gears,
  the landing gear bay comprising:
    two lateral walls;
    a roof wall;
    a front wall; and
    a rear wall;

wherein the roof wall, the front wall, and the rear wall are configured to form together a pressurization barrier between the landing gear bay and a pressurized compartment; and wherein the two lateral walls, the roof wall, the front wall, and the rear wall are formed such that the landing gear bay is formed as a complete module that is independent from a center wing box of the aircraft, such that the aircraft main landing pear module is mountable on the aircraft in a modular manner, separate from the center wing box.

2. The aircraft main landing gear module according to claim 1, comprising a system for controlling the two main landing gears that is configured to deploy or retract the two main landing gears.

3. The aircraft main landing gear module according to claim 1, comprising a belly fairing around the landing gear bay.

4. The aircraft main landing gear module according to claim 1, wherein the landing gear module comprises at least one door configured to close the landing gear bay when the two main landing gears are retracted or deployed.

5. The aircraft main landing gear module according to claim 1, wherein the landing gear module comprises a system for controlling the two main landing gears that is configured to deploy or retract the two main landing gears.

6. The aircraft main landing gear module according to claim 1, comprising a belly fairing around the landing gear bay.

7. The aircraft main landing gear module according to claim 1, wherein the aircraft main landing gear module is configured for attachment to the aircraft in a position in which the aircraft main landing gear module is spaced apart from the center wing box by a central section of the aircraft.

8. The aircraft main landing gear module according to claim 1, comprising at least one door configured to close the landing gear bay when the two main landing gears are retracted or deployed.

9. The aircraft main landing gear module according to claim 8, wherein the lateral walls, the roof wall, the front wall, the rear wall, and the one or more doors for closing the landing gear bay form a closed box.

10. The aircraft main landing gear module according to claim 8, wherein the lateral walls, the roof wall, the front wall, the rear wall, and the one or more doors for closing the landing gear bay form a closed box.

11. A central aircraft fuselage part, comprising, in order from a front towards a rear of an aircraft:
a front section of the central fuselage part;
a center wing box comprising at least a front wall, a rear wall and a roof wall that together form a pressurization barrier;
a central section of the central fuselage part comprising an intermediate wall forming a pressurization barrier, the intermediate wall comprising a front end and a rear end, the front end being connected to an edge of the rear wall of the center wing box;
a landing gear module comprising:
two main landing gears configured to be deployed or retracted alternately or simultaneously;
a landing gear bay containing the landing gears, the landing gear bay comprising:
two lateral walls;
a roof wall;
a front wall; and
a rear wall;
wherein the roof wall, the front wall and the rear wall are configured to form together a pressurization barrier between the landing gear bay and a pressurized compartment, and
wherein the rear end of the intermediate wall is connected to an edge of the front wall of the landing gear bay;
a rear section of the central fuselage part; and
a keel beam, to which the front section, the center wing box, the central section, and the landing gear module are fastened.

12. The central aircraft fuselage part according to claim 11, comprising an air conditioning and pressurization system of the aircraft.

13. The central aircraft fuselage part according to claim 11, comprising a hydraulic system.

14. The central aircraft fuselage part according to claim 11, comprising a fuel management system.

15. An aircraft fuselage comprising the central aircraft fuselage part according to claim 11.

16. An aircraft comprising the aircraft fuselage according to claim 15.

17. The central aircraft fuselage part according to claim 11, wherein the landing gear module is spaced apart from the center wing box by the central section in a longitudinal direction of the aircraft.

18. The central aircraft fuselage part according to claim 17, wherein the central section is positioned between the landing gear module and the center wing box in the longitudinal direction of the aircraft.

19. The central aircraft fuselage part according to claim 11, wherein the two lateral walls, the roof wall, the front wall, and the rear wall are formed such that the landing gear bay is formed as a complete module that is independent from the center wing box, such that the landing gear module is mountable on the aircraft in a modular manner, separate from the center wing box.

20. The central aircraft fuselage part according to claim 19, wherein the landing gear module is attached to the aircraft in a position in which the landing gear module is spaced apart from the center wing box by the central section of the aircraft.

* * * * *